Figure 2:
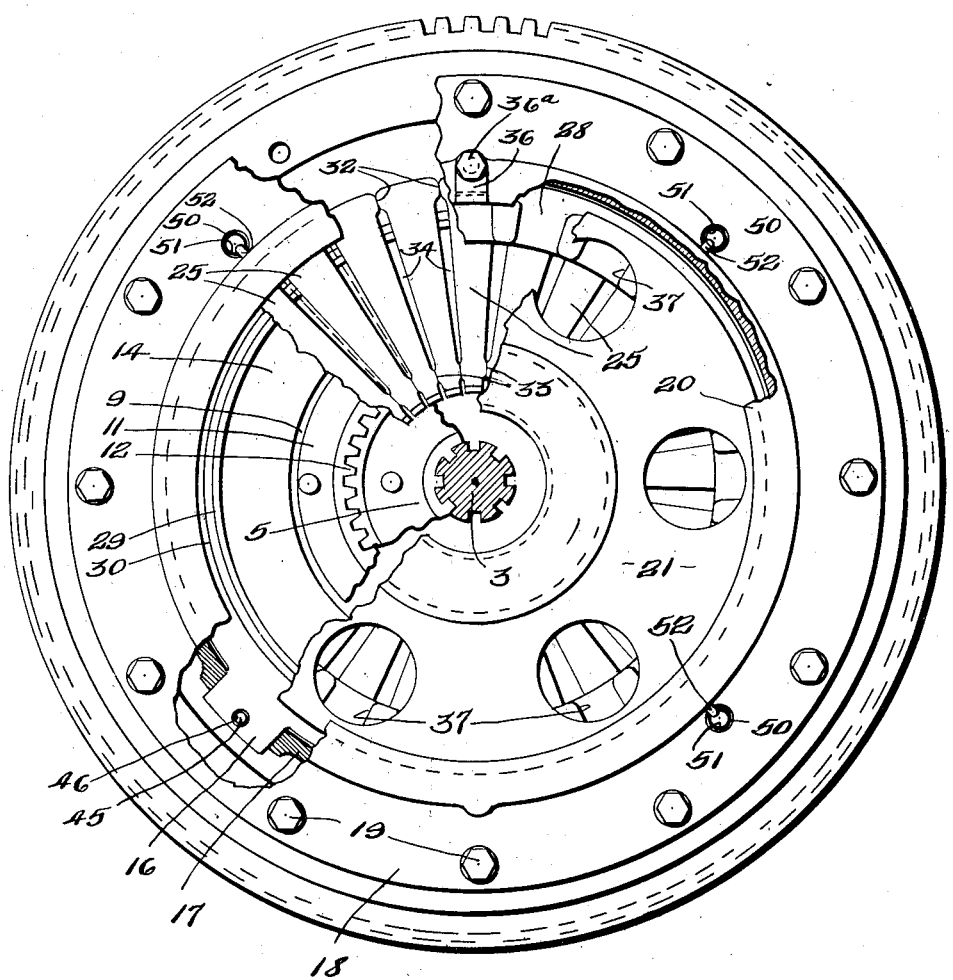

June 18, 1929.　　G. C. CARHART　　1,717,355
DOUBLE PLATE CLUTCH
Filed April 15, 1926　　2 Sheets-Sheet 1
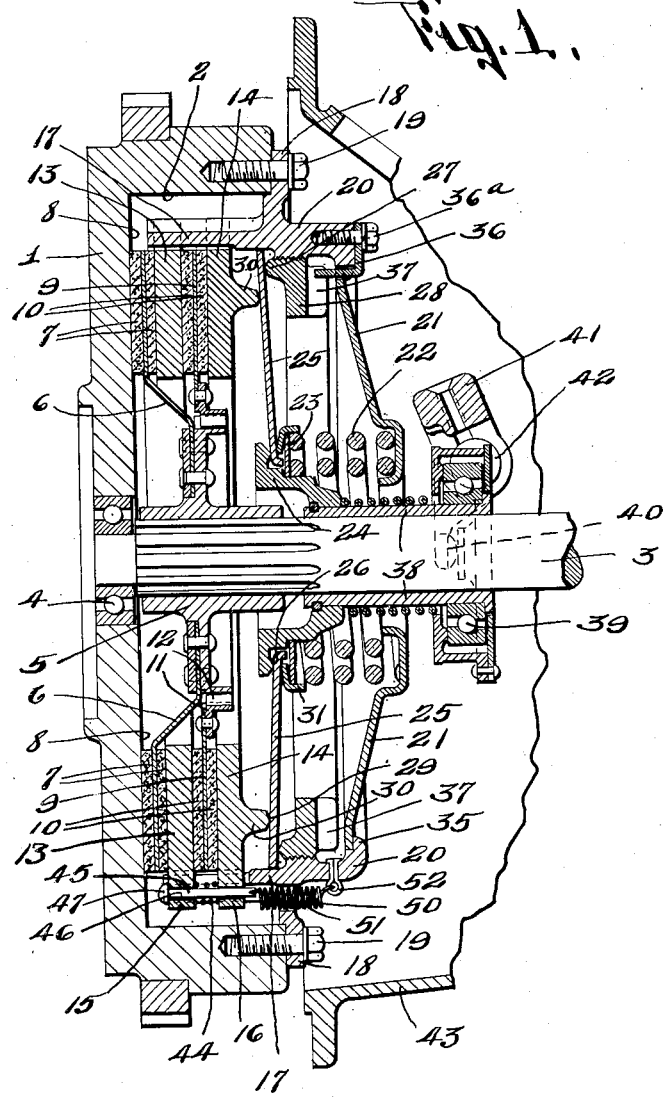
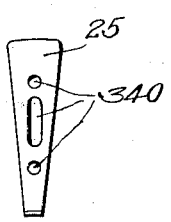
INVENTOR.
George C. Carhart
BY
ATTORNEYS.

June 18, 1929.  G. C. CARHART  1,717,355
DOUBLE PLATE CLUTCH
Filed April 15, 1926   2 Sheets-Sheet 2

INVENTOR.
George C. Carhart
BY
ATTORNEYS.

Patented June 18, 1929.

1,717,355

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

DOUBLE-PLATE CLUTCH.

Application filed April 15, 1926. Serial No. 102,318.

This invention relates to friction clutches and has for its object a particularly simple, compact and efficient clutch of the plate type of large capacity for the space it requires.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view, partly broken away, of a clutch embodying my invention.

Figure 2 is a rear elevation, partly broken away, of parts seen in Figure 1.

Figure 3 is a detail view of a modified form of one of the clutch levers.

This clutch comprises generally, driving and driven elements, one of said elements having an abutment surface and the other of said elements including a shaft and a member rotatable with the shaft and having a plurality of friction plates in the nature of the friction plate of single plate clutches, one of the friction plates coacting with said abutment surface, pressure rings alternating with the friction plates and interlocked with the former element to rotate therewith and slide axially thereof, means for applying pressure to the outermost pressure ring from the main spring of the clutch and thereby compressing the friction plates toward the abutment surface and throw-out means for relieving the pressure ring of the thrust of the main spring to disengage the clutch. The clutch also comprises means for quickly separating the friction and pressure rings when the throw-out means is operated.

Friction clutches such as are used in motor vehicles are usually of the multiple disk type or the single plate type.

In the multiple disk type, sets of interleaved disks rotatable respectively with outer and inner drums are thrust toward an abutment on the inner drum or driven member of the clutch, by the main spring of the clutch.

In the standard multiple disk clutches, the thrust of the main spring is applied directly to the pressure ring or the disks in contradistinction to through levers.

In single plate clutches, the single plate which is usually the driven member of the clutch is pressed toward an abutment surface on the other element of the clutch, that is, the driving element, by a pressure ring to which the pressure of the main spring of the clutch is applied through levers. In the multiple disk clutch, it is the area or the amount of the friction surface that gives capacity to the clutch. In the single plate clutch, it is the power of the main spring multiplied through levers that gives the clutch its capacity.

My clutch is neither a multiple disk clutch nor a single plate clutch, but is what might be called a double single plate clutch as it has more than one single plate but operates after the manner of a single plate clutch and is of greater capacity and requires a very little more space than the single plate clutch. It will be borne in mind that the single plate clutch is more compact and requires considerably less space than a multiple disk clutch of the same capacity.

In the illustrated embodiment of my invention, the element of the clutch formed with the abutment surface is as usual, the driving element and the element including the shaft and the friction plate, the driven element.

1 designates the driving element which is formed with a recess 2 opening through its rear face, the driving element being usually the fly wheel of the engine of a motor vehicle.

3 is the shaft of the driven element, which shaft is usually the stem of the stem gear of the transmission gearing as will be understood by those skilled in the art, the shaft having a pilot bearing at 4 in the fly wheel.

5 is a hub forming part of the driven element mounted on the shaft 3 to slide axially thereof, the hub being usually splined on the shaft 3. This hub is provided with a disk or plate 6 having rings of friction material 7 on opposite sides thereof, this part 6 constituting the friction plate of the clutch, and corresponding to the usual friction plate of the single plate clutch. The plate 6 or its outer annular portion which is provided with friction rings 7, is opposed to the bottom surface of the recess 2 in the fly wheel 1, which bottom surface 8 constitutes the abutment surface of the clutch, as in single plate clutches.

In multiple disk clutches, the abutment for the disks is usually on the driven member of the clutch. As here shown, the driven member is provided with two friction plates.

9 designates the other friction plate which has flat rings 10 of friction material on opposite sides thereof, this plate 9 being secured to a hub ring 11 having teeth 12 therein interlocked with complemental teeth on the hub 5 or an annular flange thereon. Thus, the plate 9 can shift axially of the hub 5, which hub 5 is shiftable axially of the shaft 3.

13 and 14 are pressure rings rotatable with the driving element 1 and alternating with the plates 6 and 9, the pressure ring 13 being located between the plates 6 and 9 and the pressure ring 14 at the rear of the plate 9. These pressure rings are provided with peripheral projections 15 and 16, here shown as four in number which projections interlock with the fly wheel 1 so that these pressure rings rotate with the fly wheel 1, and also are slidable axially of the fly wheel 1.

In the illustrated embodiment of my invention, the projections 15 and 16 extend into grooves or slots in a drum 17 extending into the recess 2 and spaced apart from the wall thereof. The drum 17 has an outwardly extending flange 18 lapping the annular rear edge of the driving element or fly wheel 1, and secured thereto as by cap screws 19. The drum is also formed with a rearwardly extending cylindrical flange 20 to which the back plate 21 of the clutch is attached.

22 designates the main spring of the clutch interposed between the back plate 21 and a spring abutment 23 on a throw-out collar 24.

25 are a series of outwardly extending levers engaging at their inner ends at 26 with the throw-out collar and the abutment 23 and at their outer ends with an annular fulcrum 27 provided on a ring 28 threading into the drum 17 or the annular flange 20 thereof, the levers thrusting between their ends and near their outer ends on an annular bearing surface 29 on an annular flange 30 projecting from the rear face of the rearmost pressure ring 14.

The throw-out collar 24 is provided with an annular bearing surface at 26 against which the levers abut, this surface 26 being an annular apex, the levers being held from displacement at their inner ends by a retaining ring 31. These levers 25 are segments of a discoidal plate and abut against each other at 32, 33, Figure 2, near their ends, but are spaced apart at 34 between their ends. The spaces between the levers permit the circulation of air during the rotation of the clutch to cool the levers. Instead of forming the passages between the levers, they may be formed in the levers by providing holes or slots between the side edges of each lever as shown at 340 Figure 3.

The rear plate 21 of the clutch is insertable in position before the adjusting ring 28 is placed in position and abuts against an internal annular shoulder 35 at the rear end of the drum 17 or the cylindrical flange 20 thereof. In other words, the parts are assembled into the drum 17 from the front end thereof.

The adjustable fulcrum ring 28 is held in its adjusted position by a retaining clip 36 secured by a cap screw 36ª to the rear edge of the drum 17 or flange 20 thereof, the clip having an angular portion extending through a hole in the back plate 21 and coacting with notches 37 in the rear of the fulcrum ring 28. These notches also facilitate the adjusting or turning of the ring 28 by a tool inserted through the hole through which the clip 36 extends.

Thus, the pressure is applied to the rearmost pressure ring and from the rearmost pressure ring through the friction plate 9, pressure ring 13 and friction plate 6 thrusting the latter against the abutment surface 8 of the fly wheel 1.

The clutch is disengaged against the action of the main spring 22 by a throw-out sleeve 38 slidable on the shaft 3 and carrying the throw-out collar 24 at its front end, this sleeve having a throw-out bearing 39 at its rear end with which coacts the fork arms 40 of the usual yoke 41 mounted on a rock shaft 42 journalled in the clutch housing 43. The rock shaft has the usual clutch pedal (not shown) thereon.

In order to disengage the friction plates and the pressure rings of the clutch when relieved of the pressure of the main spring 22, means is provided for separating the pressure rings and also moving them bodily rearwardly. This means, as here shown, consists of springs interposed between the pressure rings tending to separate them and additional springs tending to slide such rings rearwardly.

44 designates the compression springs interposed between the projections 15 and 16 of the pressure rings 13 and 14, these springs encircling pins 45 extending through perforations 46 in the projections, each pin having a head 47 at its front end thrusting against the front face of the projection 15. The rear end of this pin is connected to a tension spring 50 extending through a hole 51 in the flange 18 of the drum 17 and anchored at 52 at its outer end. As there are four sets of projections 15 and 16, there are four springs 44 and four springs 50 and the springs 44 are stronger than the springs 50.

When the throw-out collar is operated to disengage the clutch, the springs 44 are free to expand and thus move the pressure ring 14 rearwardly or to the right, while the springs 50 are pulling the pressure ring 13 to the right. As the springs 44 are stronger than the springs 50, the rear pressure ring 14 will have a greater movement rearwardly than the pressure ring 13 so that a complete separation of the pressure rings and the friction disks is effected.

As the plates and rings thrust directly against the bottom of the recess in the fly wheel, the same as the plate of the single plate clutch does and as pressure of the main spring is multiplied through levers as in single plate clutches, a clutch of the single plate type with multiple disk capacity can be installed in the relatively small space intended for single plate clutches.

What I claim is:

1. In a clutch, the combination of driving and driven elements, coacting friction plates and rings associated respectively with said elements, means for applying pressure to said rings to engage the clutch and throw-out means operable to release said plates and rings to disengage the clutch, a spring between the friction rings of one of said elements tending to separate them when the throw-out means is operated to release the clutch, and an additional spring connected to the rings to withdraw the same, the former spring being stronger than the latter.

2. In a clutch, the combination of driving and driven elements, one of said elements having an abutment surface and the other of said elements including a shaft and a member rotatable with the shaft and having a friction plate for coacting with said abutment surface and also having an additional friction plate movable axially relative to the former plate, pressure rings alternating with the friction plates and being interlocked with the former element, the pressure rings having outwardly extending projections for interlocking with the former element, means including a main spring for applying pressure to the outer pressure ring, throw-out means for relieving the pressure ring of the pressure of the main spring and thus relieving the clutch, a pin extending through the projections of the pressure rings and having a head at one end thrusting against one of the projections, a tension spring connected to the other end of the pin and to a fixed point and a spring stronger than the tension spring interposed between the projections.

3. In a clutch, the combination of driving and driven elements, the driving element comprising a member formed with a recess and with an abutment on the bottom of the recess and a drum at the rear end of the recess and detachably secured to said member, the driven element comprising a shaft, a member rotatable with the shaft and having a friction plate provided with friction means for coacting with said abutment, and also having an additional friction plate provided with friction means, the additional plate being movable axially relatively to the former plate, pressure rings alternating with said plates and interlocked with the removable drum of the driving element, means including a main spring for applying pressure to the outer pressure ring and throw out means for releasing the outer pressure ring from the pressure of the main spring and thus releasing the clutch, and means connected to the inner pressure ring and to the removable outer drum of the driving element for withdrawing the inner pressure ring when the throw out means is operated.

4. In a clutch, the combination of driving and driven elements, the driving element comprising a member formed with a recess and with an abutment on the bottom of the recess and a drum at the rear end of the recess and detachably secured to said member, the driven element comprising a shaft, a member rotatable with the shaft and having a friction plate provided with friction means for coacting with said abutment, and also having an additional friction plate provided with friction means, the additional plate being movable axially relatively to the former plate, pressure rings alternating with said plates and interlocked with the removable drum of the driving element, means including a main spring for applying pressure to the outer pressure ring and throw out means for releasing the outer pressure ring from the pressure of the main spring and thus releasing the clutch, and means connected to the inner pressure ring and to the removable outer drum of the driving element for withdrawing the inner pressure ring when the throw out means is operated, and means interposed between the pressure rings and carried thereby and tending to separate them.

5. In a clutch, the combination of driving and driven elements, the driving element comprising a member formed with a recess having an abutment surface therein and an outer drum extending into said recess and detachably secured to said member, the driven element including a shaft, a single plate having a hub mountable on and rotatable with the shaft and provided with friction means for coacting with said abutment surface, a second plate carried by the former plate and movable axially relatively thereto, the second plate also having friction means, pressure rings rotatable with the driving element and interlocked with the outer drum and alternating with said plates, means for applying pressure to the outermost pressure ring and means carried by said detachable drum and connected to the innermost pressure ring to withdraw it.

6. In a clutch, the combination of driving and driven elements, the driving element comprising a member formed with a recess having an abutment surface therein and an outer drum extending into said recess and detachably secured to said member, the driven element including a shaft, a single plate having a hub mountable on and rotatable with the shaft and provided with friction means for coacting with said abutment surface, a second plate carried by the former plate and movable axially relatively thereto, the second plate also having friction means, pressure rings rotatable with the driving element and interlocked with the outer drum and alternating with said plates, means for applying pressure to the outermost pressure ring and means carried by said detachable drum and connected to the innermost pressure ring to withdraw it, and means between the pressure rings and carried thereby and tending to separate them.

In testimony whereof, I have hereunto signed my name, at Syracuse, in the county of Onondaga and State of New York, this 14th day of April, 1926.

GEORGE C. CARHART.